United States Patent
Hitzl et al.

(10) Patent No.: US 9,556,384 B2
(45) Date of Patent: Jan. 31, 2017

(54) METHOD FOR EXTRACTING BIOCHEMICAL PRODUCTS OBTAINED FROM A PROCESS OF HYDROTHERMAL CARBONIZATION OF BIOMASS

(75) Inventors: Martin Hitzl, Valencia (ES); Michael Renz, Valencia (ES); Avelino Corma Canos, Valencia (ES)

(73) Assignee: INGELIA, S.L., Valencia (ES)

(*) Notice: Subject to any disclaimer, the term of this patent is extended or adjusted under 35 U.S.C. 154(b) by 292 days.

(21) Appl. No.: 14/114,818

(22) PCT Filed: Dec. 22, 2011

(86) PCT No.: PCT/ES2011/700894
§ 371 (c)(1),
(2), (4) Date: Jan. 6, 2014

(87) PCT Pub. No.: WO2012/168502
PCT Pub. Date: Dec. 13, 2012

(65) Prior Publication Data
US 2014/0142353 A1    May 22, 2014

(30) Foreign Application Priority Data

Jun. 9, 2011   (ES) .................................. 201130964

(51) Int. Cl.
C10G 1/00 (2006.01)
C10G 1/02 (2006.01)
C10L 9/08 (2006.01)

(52) U.S. Cl.
CPC ............... *C10G 1/002* (2013.01); *C10G 1/008* (2013.01); *C10G 1/02* (2013.01);
(Continued)

(58) Field of Classification Search
None
See application file for complete search history.

(56) References Cited

U.S. PATENT DOCUMENTS

2008/0032344 A1   2/2008   Fallavollita
2011/0225876 A1*   9/2011   Hitzl .................... B01J 19/0006
                                                      44/307

FOREIGN PATENT DOCUMENTS

DE   10 2009 008 563   8/2010
ES   2 339 320   5/2010
(Continued)

OTHER PUBLICATIONS

International Search Report issued Apr. 10, 2012 in International (PCT) Application No. PCT/ES2011/070894.

*Primary Examiner* — In Suk Bullock
*Assistant Examiner* — Philip Louie
(74) *Attorney, Agent, or Firm* — Wenderoth, Lind & Ponack, L.L.P.

(57) ABSTRACT

The invention relates to a method for extracting biochemical products obtained from a process of hydrothermal carbonization of biomass, which includes feeding an aqueous mixture of biomass from a preheating tube for the aqueous mixture of biomass to a vertical reactor with a predetermined level of floatation and an area for accumulation of steam and gases in the upper part thereof, wherein said method for extracting biochemical products is characterized in that it includes (a) heating the aqueous mixture of biomass to, or above, evaporation temperature in said vertical reactor and/or in a previous stage of preheating the aqueous mixture of biomass, increasing the generation of stream and/or gases at the predetermined flotation level of the vertical reactor, (b) extracting the steam and/or gases generated in the previous stage and accumulated in the upper part of the vertical reactor, and (c) cooling the gases and/or condensing the steam extracted in the previous stage at different levels of temperature and pressure. The invention likewise relates to (Continued)

the biochemical product obtainable from said method, as well as to a system for implementing said method.

10 Claims, 1 Drawing Sheet

(52) U.S. Cl.
CPC ...... *C10G 2300/1011* (2013.01); *C10L 9/086* (2013.01); *C10L 2290/54* (2013.01); *Y02E 50/13* (2013.01); *Y02P 30/20* (2015.11)

(56) References Cited

FOREIGN PATENT DOCUMENTS

| ES | 2 339 321 | 5/2010 |
|----|-----------|--------|
| WO | 01/29149 | 4/2001 |
| WO | 2006/117002 | 11/2006 |
| WO | 2008/095589 | 8/2008 |
| WO | 2009/090072 | 7/2009 |
| WO | 2010/012997 | 2/2010 |

* cited by examiner

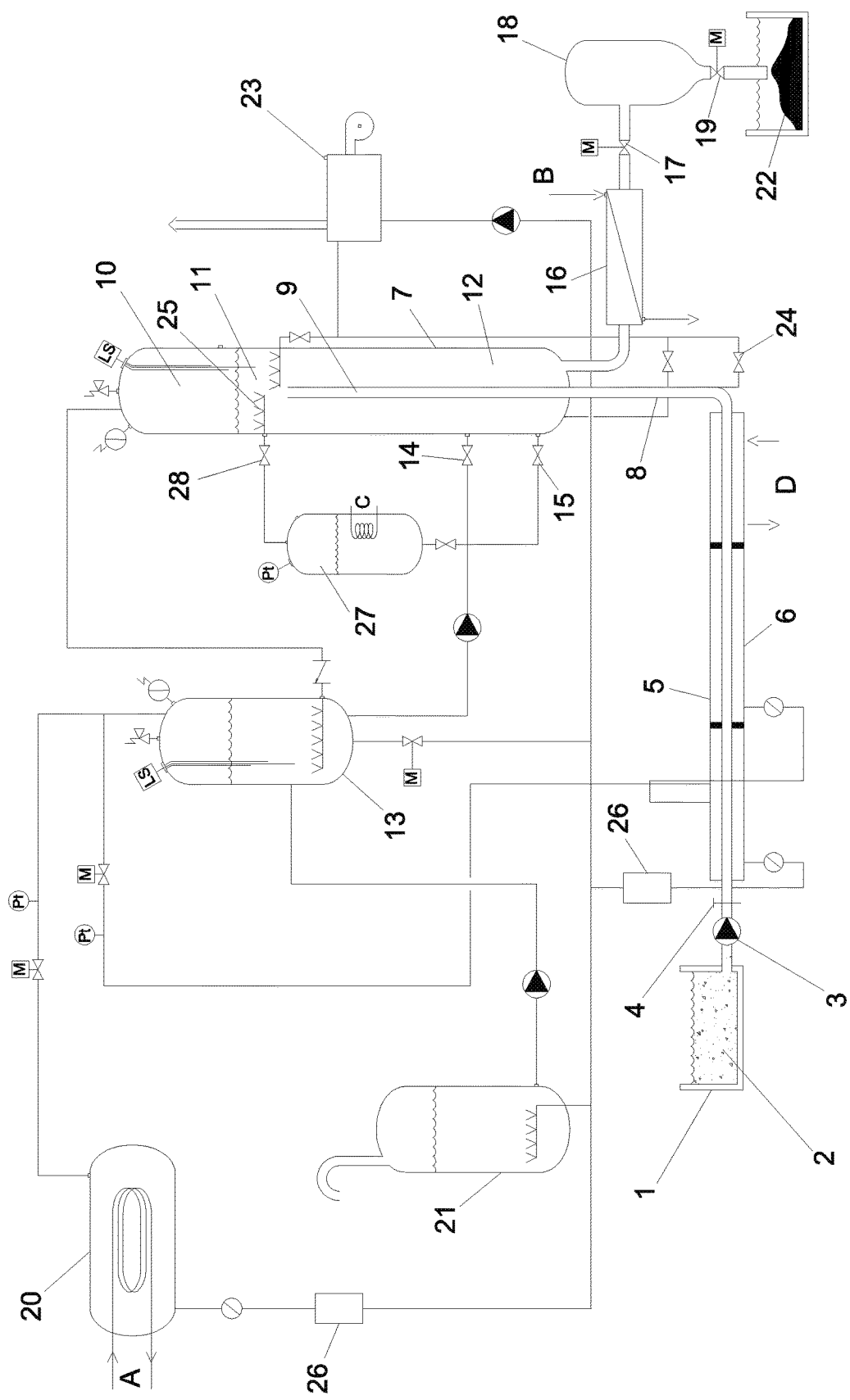

METHOD FOR EXTRACTING BIOCHEMICAL PRODUCTS OBTAINED FROM A PROCESS OF HYDROTHERMAL CARBONIZATION OF BIOMASS

TECHNICAL FIELD

The present invention relates to the chemical industry and falls, more specifically, within the field of the hydrothermal carbonization of biomass processes.

STATE OF THE ART PRIOR TO THE INVENTION

The hydrothermal carbonization process has been known about ever since Friedrich Bergius described it in 1913 and has been described in literature, for example in *Chem. Mater.*, 2007, 19 (17), 4205-4212 and *New J. Chem.*, 2007, 31, 787-789. Nevertheless, industrial plants based on this process have only been developed in recent years. Ingelia is one of the first companies to have developed a continuous industrial hydrothermal carbonization process, as described in Spanish patents ES 200803271 and ES20080372. The aim of the process is to give new value to biomass produced in the agroindustry, such as orange peel, olive stones and other fruit and vegetable waste, as well as other kinds of biomass such as waste from pruning and gardening. This kind of biomass often has a high water content (of 80% or more) which prevents it being used economically for any other purpose.

In the two Spanish patents cited above, carbon is obtained as a desired product, along with an aqueous liquid stage, which is extracted from the reactor along with the carbon. In the aqueous liquid stage, remnants of the dissolved biomass remain, which have not been joined to the carbon by means of polymerization. Steam and/or gases are extracted through valves in the upper portion of the reactor. In this case, water would be introduced into the reactor along with the biomass or it would be introduced in steam form in order to heat the reactor. The gases mostly consist of air (nitrogen and oxygen) which have been introduced into the reactor along with the biomass. If the biomass has previously been deposited and has not been processed within the short term of its production, methane may also have been produced. This gas may be introduced into the reactor with the biomass and is recovered along with the air at the gas output in the upper portion of the reactor. Other than the gases introduced with the biomass, carbon dioxide may also be recovered, which is produced by means of decarboxylations of the biomass, with or without having undergone previous oxidation reactions.

Conditions in the hydrothermal carbonization process are smooth, especially in comparison with other biomass treatment methods such as pyrolysis or gasification, given that the biomass is broken down by means of hydrolysis in carbon-oxygen bonds, such as acetyls, ethers or esters. A carbon-carbon bond is only broken in exceptional cases such as in a retroaldol condensation when a specific functionality exists in the molecule. Pyrolytic fragmentations do not occur, as is the case in pyrolysis and gasification. Given the absence of these reactions, they do not form oils known as bio-oils in the case of pyrolysis either.

Industrial development of the hydrothermal carbonization of biomass process has surprisingly shown that in addition to the desired product, the solid biofuel, when employing certain types of biomass, also produces an oily liquid product, henceforth referred to as oil. It has therefore been possible to produce oil from orange peel, for example, as well as from pine clippings. The composition of this oil will vary according to the biomass used and is yet to be discovered, given that, as mentioned above, the industrial development of the hydrothermal carbonization of biomass process is still relatively recent technology. The first chromatographic analyses carried out show that they are composed of a mixture of over 100 different chemical substances and the value of the oil is estimated at 0.50 Euros per liter if used as fuel.

In scientific or patent literature, no background on the process of benefiting from the oil generated in the hydrothermal carbonization of biomass process has been found. However, the added value of certain oils derived from biomass obtained from other process is known about, for example the oil obtained from orange peel or the oil obtained from pine biomass (known as pine oil or tall oil), when processing pine wood in pulp mills, for instance.

The present invention therefore aims to give the oils generated in the hydrothermal carbonization process new value or to isolate particularly valuable compounds from them. The document will henceforth refer to all the oils as "biochemical products", pure components which are either extracted from the hydrothermal carbonization process or extracted after a catalytic transformation.

DESCRIPTION OF THE INVENTION

The present invention is based on the hydrothermal carbonization of biomass process (HTC process), designed to polymerize the biomass as much as possible, thereby producing maximum hydrothermal carbon output, which may also be referred to as solid biofuel. It is understood that, in order for this to occur, the biomass, composed of different components such as lignin, cellulose and/or hemicellulose must firstly be depolymerized. This stage is also referred to as the monomerization stage. In this stage, mono-sugars are formed, for example, as hexoses or pentoses. The molecules formed during the monomerization stage are dehydrated in order to form carbonylic compounds from the group of aldehydes, such as furanic compounds and, more specifically, 5-hydroxymethylfurfural or furfural, for example.

In a second stage, the aldehyde compounds polymerize. These oils, observed and described for the first time, are fundamentally different from bio-oils in terms of their composition and origin. Bio-oils are produced during pyrolysis by breaking carbon-carbon bonds and are mix very easily with water. The biochemicals, object of the present invention, are now present in the original biomass without it being possible to extract them using an economically profitable method. These biochemicals are surprisingly recovered along with the process water, which is extracted from the reactor at the steam stage.

This stage is known as the polymerization stage, wherein not only the aldehyde compounds react but also aromatic compounds (coming from the lignin), unsaturated compounds and acid compounds (for example, products originating from the breakdown of the sugars). In the work described in *J. Phys. Chem. C* 2009, 113, 9644-9654, the composition of a simple hydrothermal carbon obtained from glucose was analyzed by means of nuclear magnetic resonance. As a result, it was observed that 60% of this carbon corresponds to an interconnected network of furanic units. In addition to the compounds described, it is also possible to find copolymerized levulinic acid, as well as aromatic heads.

These aromatic heads, however, are less abundant, owing mainly to the fact that real biomass has not been used but rather only cellulose.

To sum up, the aim of this process is to obtain a copolymer designed to produce energy by means of combustion, which is why drastic conditions are employed (such as a pressure of up to 18 bars) in order to favor any kind of polymerization. As a result of this, it is surprising to obtain double bond compounds and/or compounds with a carbonylic group such as biochemical products. In unsaturated polymerization compounds conditions (compounds with a double bond), as well as carbonylic groups in the presence of furanic compounds, polymers with high molecular weight are formed, which are solid and cannot be extracted using steam and/or gasses containing a certain amount of water.

Spanish patents ES2339320 and ES2339321 may be cited as the closest background to the invention. In patent ES239320, a method for the hydrothermal carbonization of biomass is described, characterized in that it comprises feeding the biomass to a vertical reverse flow reactor via an ascent tube, in which a monomerization process is initiated. Meanwhile, oils begin to be formed and gasses are got rid of, for example methane or $CO_2$, generated by the natural break-down of the biomass. The gasses rise up the inside of the ascent tube until they accumulate in the upper part of the reactor, from where they are evacuated, along with the saturated water vapor, towards the pressure control deposit.

Although the density of the biomass may vary and be lesser or greater than that of the water, once the monomerization stage has begun, the components derived from the same tend to rise and float on the surface. This effect makes it possible for these compounds to remain near the level of flotation, once they have reached the mouth of the ascent tube, in such a way that the reactor maintains a set level of the solid-liquid stage and the upper portion of the reactor comprises process steam and gasses.

Therefore, in normal conditions, the HTC process has already started at the ascent tube output and the components resulting from the first monomerization phase enter into a second, polymerization stage. In this new second stage, the oils and other components that have formed during monomerization, polymerize and form a kind of resin or pre-carbon state. Depending on the type of biomass and the conditions in which the process takes place, this stage lasts between 1 and 6 hours and preferably between 2 and 4 hours.

However, given that this process is exothermic by nature, it is important to control the pressure and temperature conditions, so that they remain within the process limits established. The preferred temperature interval must specifically be between 170° C. and 230° C., preferably between 179.9° C. and 219.6° C. and more preferably between 191.6° C. and 209.8° C., whilst the preferred pressure interval is between 8 and 28 bars of absolute pressure, preferably between 10 and 23 bars and more preferably between 13 and 19 bars. These values will depend on both the type of biomass and the product to be obtained.

The reason why it is necessary to control the conditions in which the process takes place well is to prevent excessive operating temperatures from being reached, at which chemical processes in addition to the HTC process may arise, which could give rise to an excess of $CO_2$, for example. When not evacuated properly, this $CO_2$ could in turn give rise to an unwanted increase in pressure inside the reactor.

According to the HTC process, the density of the solid compounds formed increases whilst the thermal activity meanwhile decreases. As a result of these effects, the compounds drop, within the process water, towards the maturity area.

Upon this third stage being initiated, the main carbon formations have now been developed, although the carbon structures formed can still lose $H_2O$ molecules. After 2 to 12 hours, depending on the type of biomass and the process conditions, thermal activity will have decreased to practically zero.

Based on the previous process, described in Spanish patent ES2339320, the present invention makes it possible to increase extraction of the so called biochemicals from a transfer of gases and steam in the upper area of the reactor, which must coincide with the monomerization stage of the hydrothermal carbonization of biomass process. At this point in the process and depending on the biomass provided, various chemical products are freed and formed, including both pure components and compounds, amongst which oils, acids, aldehydes etc., may be found. This set of chemical products, for the purposes of this patent, shall be referred to as biochemical products, which may be carried and extracted in steam and/or gas form.

Therefore, the object of this invention is a method for extracting biochemical products obtained from a process of hydrothermal carbonization of biomass, which comprises feeding an aqueous mixture of biomass to a vertical reactor, preferably a reverse flow vertical reactor, via an ascent tube in which a monomerization process on the aqueous biomass mixture occurs. According to the description given in patent ES2339320, this monomerization stage may take place in the ascent tube, located in the central portion of the vertical reverse flow reactor, as well as at the mouth of the same, just below the level of flotation, where evaporations form, which are evacuated through the upper portion of the reverse flow vertical reactor.

The biochemical product extraction method, object of the present invention, is specifically characterized in that it comprises feeding an aqueous mixture of biomass from a preheating tube for the aqueous biomass mixture to a vertical reactor with a defined flotation level and an area for accumulation of steam and gasses in its upper portion, where this biochemical product extraction method is characterized in that it comprises:

(a) Heating the aqueous biomass mixture up to or above the evaporation temperature in the same vertical reactor and/or in a prior preheating stage of the aqueous biomass mixture, increasing the generation of steam and/or gases at the vertical reactor's defined level of flotation.

(b) Extracting the steam and/or gases generated in the previous stage, which have accumulated in the upper portion of the vertical reactor.

(c) Cooling the gases and/or condensing the steam extracted in the previous stage to different temperature and pressure levels.

(d) Separating the biochemical of the condensers generated in the previous stage.

In a preferred embodiment of the invention, the reactor may consist of a vertical reverse flow reactor with an ascent tube inside, in which the monomerization of the aqueous biomass mixture is initiated, as described in patent ES2339320.

In a specific embodiment of the invention, the prior preheating stage of the aqueous biomass mixture may take place in at least one preheating tube wrapped in an external jacket. In this case, the heating of the aqueous biomass mixture may take place by means of circulating a heat-carrying fluid around a jacket located in the external portion of said preheating tube, by means of the direct injection to said preheating tube of at least one saturated or overheated steam and/or by means of the direct injection into said preheating tube of hot gases.

Additionally or alternatively, the heating of the aqueous biomass mixture may take place in the same vertical reactor. In a specific embodiment in which the vertical reactor corresponds to the vertical reverse flow reactor, in accordance with patent application ES2339320, said heating may be carried out by means of the direct injection of at least one saturated or superheated steam and/or hot gasses in the ascent tube of the reverse flow reactor and/or in the reverse flow reactor itself, below the level of floatation of the aqueous biomass mixture. Depending on where the saturated or overheated steam is introduced, the flow of the same and the level to which the steam is overheated, it would be possible to regulate the amount of transfer and extraction of biochemical products in the vertical reverse flow reactor.

This means that, using the described heating method to heat the aqueous biomass mixture, the extraction of the so called biochemical products is successfully increased by means of a gas and/or steam transfer in the upper area of the reactor during the monomerization stage of the hydrothermal carbonization of biomass process. At this point of the process, depending on the biomass provided, different chemical products are freed and formed, which may be oils, acids, aldehyde byproducts, etc.

Once the steam has been extracted from the vertical reactor, it is possible to go on to condense the same in at least one piece of condensation equipment, for example a heat exchanger of the tubular variety with a coolant fluid within the tubing and/or in the jacket of the preheating tube located behind the vertical reactor. The condensation of steam may take place at different temperature and pressure levels, depending on the type of biochemical product you wish to obtain.

In order to improve extraction results, it is possible to adapt the condensation area, preferably through flow regulation valves, depending on temperature and/or pressure, pieces of equipment to separate gases and pieces of equipment to evacuate and drive the condensed products.

Once the condensed steams and biochemical products have been obtained (which comprise oils, etc.,) said condensed product may be driven to pieces of separation equipment, for example decantation, centrifugation, filtration, etc., in which the oils and biochemical products are separated and the swept gases are extracted. Once the biochemical products have been separated, the remaining condensed products, which comprise a mixture of different acids and water, may be chemically evaluated and/or driven to at least one condensed product deposit and, from there, may be fed back into the process.

The biochemical product or products obtained from said method is likewise an object of the present invention, as well as the use of the same, for example in evaluation methods by means of catalytic transformation.

In addition, a system to carry out a method as previously described constitutes the object of the invention.

In a particular embodiment of the invention, this system may be based on the system described in Spanish patent ES2339321. In addition to the pieces of equipment described in this patent, the system object of the present invention may additionally comprise at least one condensation system for the condensation of the steam extracted from the vertical reverse flow reactor. In a particular embodiment of the invention, the steam and/or gasses extracted from the vertical reverse flow reactor may be driven directly from this reactor towards one or many of the pieces of condensation equipment, to accelerate condensation of the steam. In this case, the pressure regulation deposit, according to the description in patent ES2339321, will remain parallel to the pieces of condensation equipment and on occasions, may remain without steam transfer. As a result of this, in a preferred embodiment of the invention, the temperature and pressure regulation deposit may additionally comprise an external heat delivery system to keep it warm, such as a steam injection system or a heat exchanger, for example, which may likewise act as a steam generator for its injection into the reactor.

BRIEF DESCRIPTION OF THE DRAWINGS

FIG. 1 is a diagram of the process, object of the present invention. Please find a list of the references used in this figure below:
1. Storage hopper.
2. Mixture of biomass, process water and catalyst.
3. Compression pump.
4. Gate valve.
5. Preheating tube.
6. Hot fluid.
7. Vertical reverse flow reactor.
8. Ascent tube.
9. Monomerization area.
10. Gas and water vapor area.
11. Polymerization area.
12. Maturity area.
13. Pressure regulation deposit.
14. Regulation valve.
15. Regulation valve.
16. Piece of cooling equipment.
17. Decompression valve.
18. Flash deposit.
19. Decompression valve.
20. Heat exchanger.
21. Condensed products deposit.
22. Final product.
23. Steam boiler.
24. Regulation valve.
25. System for injecting steam into the reactor.
26. Piece of (biochemical substance) separation equipment.
27. Evaporation device.
28. Valve.
Flows:
A. Coolant fluid I
B. Coolant fluid II
C. Heat flow I
D. Heat flow II

PREFERRED EMBODIMENT OF THE INVENTION

Below, a particular embodiment of the object of the present invention is set out by way of a non-limiting example, as represented in FIG. 1. This figure is based on the hydrothermal carbonization of biomass process, as described in patent ES2339320. As can be seen in the figure, the process begins in the storage hopper (1), from where a biomass mixture leaves towards the compression pump (3) wherein it is compressed to a pressure of at least 13 bars, which is the pressure of the reactor plus the pressure required to conquer the counter pressure created in the course of the preheating tube (5) and the ascent tube (8). It is then transported along the length of the preheating tube (5), until a temperature of around 180° C. is reached. Following this heating stage, the mixture is fed into the vertical reverse flow reactor (7), which is 6 m long with a 1 m diameter, via the ascent tube (8), which is 20 cm in diameter and occupies 60% of the height of the reactor.

Then, should the reactor have a cold start, vapor is injected at a temperature of around 195° C., through the lower portion of the same, both through the ascent tube (8) and through the maturity area (12), until the temperature and pressure needed for the process are obtained, therefore beginning the monomerization stage. At the same time, owing to the natural break down of the biomass itself, gases begin to be got rid of, for example methane or $CO_2$, which rise up the inside of the ascent tube (8) until they accumulate in the high portion of the reactor (10). From there, they are evacuated, alongside the saturated steam, towards a pressure regulation deposit (13).

Meanwhile, once they reach the output of the ascent tube (11), the products resulting from the first monomerization stage start the second, polymerization stage, during which they are transformed into a kind of resin or pre-carbon state. Furthermore, during this stage, since it is an exothermic stage by nature, it will be necessary to contribute a certain amount of process water in order to successfully keep the operating temperature stable, at around 191° C., as well as to ensure a constant volume in the reactor. This provision of condensed products is made via the valve (14) and comes from the pressure regulation deposit (13).

Once 3 hours have passed, the solid components are dense enough to be able to start their descent towards the maturity area (12), where they will remain for 8 hours or more, until their thermal activity is reduced to practically zero.

In additional, an evaporation device (27) is available, in which part of the product of the reaction coming from the maturity stage (12) is heated and evaporated in such a way that the gasses generated are reintroduced into the vertical reverse flow reactor (7) via the valve (28) and the steam injection system to the reactor (25). This evaporation device (27) in turn comprises an external heat supply system (c) which serves to keep the temperature constant.

Once the carbonization process has come to an end, the carbonized biomass mixture and process water enter into the piece of cooling equipment (16), where their temperature is reduced to around 90° C. Finally, once cooled, the mixture is extracted via the decompression valves (17) and (19), passing through the intermediate flash deposit (18), thereby producing a product composed by a liquid stage and by solid carbonized biomass particles.

In order to maximize the recovery of biochemical products produced during the monomerization stage of the process, the steams and gases generated and accumulated in the high portion of the reactor (10) are directed directly from the reverse flow reactor (7) towards the pressure regulation deposit (13). In turn, the gases originating from this pressure regulation deposit (13) are sent to the heat exchanger (20) or to the preheating tube (5), which act as pieces of condensation equipment to accelerate the condensation of the steam. In this case, the pressure regulation deposit (13) is located parallel to said piece of condensation equipment, and on occasion, may remain without steam transfer.

After having obtained the condensed steam products and biochemical products (comprising oils, etc.), said condensed product is driven to pieces of separation equipment (26), such as pieces of decantation, extraction, distillation, centrifugation and filtration equipment, etc., where the oils and biochemical products are separated and the swept gasses are extracted. Once the biochemical products have been separated, the condensed product remnants, comprising a mixture of different acids and water, may be chemically evaluated and/or driven to at least one condensed product deposit (21) and from there, they may be fed back into the process.

The invention claimed is:

1. A method for extracting biochemical products during a process of hydrothermal carbonization of biomass, comprising feeding an aqueous mixture of biomass from a preheating tube to a vertical reactor with a defined level of flotation and an area for the accumulation of steam and gases in its upper portion, wherein said method for extracting biochemical products comprises:
    (a) Heating the aqueous mixture of biomass up to or over an evaporation temperature of the biomass in the vertical reactor by means of a direct injection of at least one saturated overheated steam and/or of hot gases into the vertical reactor itself, below the defined level of flotation of the aqueous mixture of biomass to increase the generation of steam and/or gases at the set level of flotation of the vertical reactor and to release and form biochemical products;
    (b) Extracting the biochemical products alongside the steam and/or gases generated in the previous stage, which accumulated in the upper portion of the vertical reactor during a monomerization stage of the hydrothermal carbonization of biomass process;
    (c) Cooling the gases and/or condensing the steam extracted in the previous stage at differing temperature and pressure levels; and
    (d) Separating the biochemical products from the cooled gases and/or the condensed steam generated in step c).

2. The method, according to claim 1, wherein the vertical reactor is a vertical reverse flow reactor comprising an ascent tube inside the vertical reverse flow reactor, wherein the monomerization of the aqueous mixture of biomass is started in the ascent tube.

3. The method, according to claim 1, further comprising an additional preheating stage of the aqueous mixture of biomass which takes place in a preheating tube, by means of the circulation of a heat carrying fluid through a jacket located in the external portion of said preheating tube, by means of the direct injection of at least one saturated or overheated steam into said preheating tube, by means of the direct injection of hot gases into said preheating tube or by means of any combination thereof.

4. The method, according to claim 2, wherein said heating of the aqueous mixture of biomass takes place by means of the direct injection of at least one saturated or overheated steam and/or hot gases into the ascent tube of the vertical reverse flow reactor.

5. The method, according to claim 1, comprising an additional pressure and temperature regulation stage of the steam and/or gases with the biochemical products in a pressure regulation deposit.

6. The method, according to claim 1, wherein the condensation of steam takes place in at least one piece of condensation equipment and/or a jacket of a preheating tube located before the vertical reactor.

7. The method, according to claim 1, wherein separation of the biochemical products from the cooled gases and condensed steam is carried out by a separation technique selected from the group consisting of decanting, extraction, distillation, filtration, centrifugation, and any combination thereof.

8. The method, according to claim 7, wherein at least a part or all of the separated condensed products are chemically evaluated and/or driven to at least one condensed product deposit and from there, fed back into the vertical reactor.

9. The method, according to claim 1, further comprising an additional step of producing liquid fuels by means of catalytic transformation using the biochemical product produced by said method.

10. The method, according to claim 1, further comprising an additional step of producing liquid fuels by means of a hydrogenation process using the biochemical product produced by said method.

* * * * *